Patented May 24, 1932

1,859,888

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PROCESS OF REGENERATING SPENT ALKALINE LIQUOR TO FRESH ACID COOKING LIQUOR

No Drawing. Application filed February 2, 1927. Serial No. 165,506.

This invention relates to the regeneration of spent alkaline liquors, particularly alkaline sodium base liquors, resulting from the digestion of cellulosic material, and has for its object an economical and effective treatment of such liquors to regenerate the same to a form suitable for practising acid digestion therein.

In accordance with the process of the present invention, the spent liquor is treated with sulphuric acid as such and/or in the form of niter cake. The sulphuric acid reacts with the sodium organic complexes, such for example as the oxalates, acetates, saccharates and other soluble sodium organic compounds formed by the reaction of the sodium with the organic acids, aldehydes, and the like, resulting from the hydrolysis of the less-resistant celluloses, ligneous material and other non-alpha cellulose constituent of the cellulosic material subjected to treatment with the alkaline liquor. The sulphuric acid reacts with such spent liquor and displaces the weak acid or other radical to form sodium sulphate in solution. Such treatment is accompanied by a heavy coagulation of organic matter as a result of the decomposition or disruption of the sodium organic compounds, such organic matter rapidly settling to produce a substantially clear, supernatant solution of sodium sulphate. The supernatant solution may be decanted or otherwise separated from the organic matter and acidulated with sulphur dioxide to produce a sulphurous acid solution of sodium sulphate of the desired free $SO_2$ strength. Such a solution is effective for the production of sulphite pulp as described in my Patent No. 1,427,125, dated August 29, 1922. When such a liquor is employed for fiber liberation, the fiber-liberating action is believed to be exercised by the sodium sulphite formed by metathetical reaction of the sodium sulphate in solution with the sulphurous acid. Such sodium sulphite apparently reacts with the products of hydrolysis of the cementitious or encrusting material of the wood chips, and as it is expended in the reaction, sodium sulphite is progressively formed by reaction of the sulphurous acid with the sodium sulphate.

The applicability of the process of the present invention may best be understood by reference to a specific example of procedure such as the following. Wood pulp of high alpha cellulose content, suitable for use as a cotton-fiber substitute, is sometimes produced by digesting a predigested pulp, such as sulphite pulp for instance, in an alkaline liquor, and more particularly solutions of caustic soda and/or sodium carbonate.

Such liquor is effective in removing by dissolution non-alpha cellulose constituents from the pulp to form soluble sodium organic compounds, so that if the pulp is digested in a liquor of sufficient alkalinity at an appropriate temperature for an adequate period of time, a pulp high in alpha or resistant cellulose is produced. The resulting liquor may be separated from the pulp, as by passing the digested charge through a countercurrent washer of the type which effects a separation of the spent liquor from the pulp without effecting a substantial dilution of the latter. Such separated spent alkaline liquor usually contains, in addition to the sodium organic compounds, a certain proportion of free or unspent sodium compound in the form of caustic soda and/or sodium carbonate, depending upon the chemicals which have been employed in digestion. If the spent liquor is insufficiently concentrated to produce, after treatment with sulphuric acid and acidulation with sulphur dioxide, an acid liquor of the requisite sodium sulphate concentration, it may be concentrated to the desired extent prior to or after treatment with the sulphuric acid. Usually, however, concentration of the spent liquor is unnecessary, as the concentration of sodium constituent in the liquor is sufficiently high to produce a liquor of a sodium sulphate concentration necessary to support fiber liberation. For instance, in producing a pulp of high alpha cellulose content, predigested pulp is sometimes digested at about room temperature in a caustic soda solution. The spent liquor resulting from such digestion is sufficiently concentrated in sodium constituent to produce, after acidification with sulphuric acid, a liquor of sufficient sodium sulphate concentration.

The spent liquor is treated with sufficient sulphuric acid to cause the decomposition or disruption of the sodium organic compounds which were formed by reaction of the alkaline sodium compounds with the non-alpha cellulose content of the pulp. When the sodium concentration in such spent liquor is insufficiently high, in lieu of concentrating such liquor, niter cake, either alone or with sulphuric acid, may be used for such treatment, in sufficient amount to bring up the sodium sulphate concentration in the resulting liquor to the desired point. The sulphuric acid treatment produces a heavy coagulation of organic matter, which settles rapidly to produce a substantially clear, supernatant solution of sodium sulphate. If the solution is distinctly acid, it may be desirable to neutralize partially or completely such acid, as sulphuric acid may be undesirable in the acid cooking liquor. Such partial or complete neutralization may be made after the organic matter has been settled and separated out so as to avoid a resolution of such organic matter upon the addition of alkaline neutralizing reagent. After the organic matter has been separated out, the clear solution of sodium sulphate is acidulated with sulphur dioxide to the desired free $SO_2$ strength, as by passing it and sulphur dioxide in countercurrent flow through a mass of inert interstitial material. Such an acid liquor may be employed for the production of sulphite pulp from raw cellulosic material. When it is desired to produce an acid cooking liquor initially containing, in addition to sodium sulphate, a substantial amount of sodium sulphite, the treatment of spent alkaline liquor is effected with both sulphurous and sulphuric acids to produce a solution of sodium sulphate and sodium sulphite. Or the treatment may be effected with niter cake and sodium bisulphite, particularly when it is desired to increase the concentration of sodium constituent.

One of the advantages of employing sulphuric acid or both sulphuric and sulphurous acids in regenerating spent alkaline liquor to fresh acid cooking liquor is that a complete decomposition and coagulation of the organic material is more readily effected than when sulphurous acid alone is used, as disclosed in my Patent No. 1,598,880, dated September 7, 1926. In such latter case, it is more difficult to coagulate and separate out completely the organic matter, and frequently it is necessary to filter the liquor several times to produce a sodium sulphate solution of suitable clarity. My theory is that the effectivity of sulphuric acid in producing complete coagulation of organic matter in spent alkaline liquor resides in its great acid strength or high dissociation into

and accordingly its great tendency to displace the weak organic acids combined with the sodium.

Another advantage in using sulphuric acid is that the spent alkaline liquor may be effectively treated while hot, so that, should concentration of the resulting sodium sulphate solution prior to acidulation with sulphur dioxide be desired, as by evaporation in the usual evaporators, its heat content is conserved for such evaporation. A further advantage is, that when it is desired to increase the concentration of sodium constituent in the spent alkaline liquor this may be accomplished with niter cake, which is a relatively inexpensive chemical as compared with other sodium base chemicals, such as caustic soda, sodium carbonate, sodium sulphite, or bisulphite, or salt cake.

The process of the present invention is not only applicable to spent liquors resulting from a digestion of predigested pulp, but also to spent liquors resulting from the alkaline digestion of raw cellulosic material. For instance, it may be applied to spent liquors resulting from soda process of digestion when a soda pulp and sulphite pulp are being produced in the same or adjacent mills.

By my process, certain other desirable ends are attained. Thus, it is possible to dispense with the usual evaporating and smelting steps which are usually practised in recovering or regenerating the sodium constituent of spent alkaline liquors, such as practised, for example, in the recovery processes practised in connection with the manufacture of soda pulp and the usual causticization necessary to convert the sodium carbonate of the smelt solution into caustic soda.

I claim:

1. A process which comprises treating with sulphuric acid spent alkaline liquor resulting from the digestion of cellulosic material to coagulate organic matter from such liquor and thus to produce an alkali metal sulphate liquor, separating out the coagulated organic matter, and acidulating the liquor with sulphur dioxide, for the acid digestion of cellulosic material.

2. A process which comprises treating with sulphuric acid spent alkaline sodium base liquor resulting from the digestion of cellulosic material to coagulate organic matter from such liquor and thus to produce a sodium sulphate solution, separating out the coagulated organic matter, and acidulating the solution with sulphur dioxide for the acid digestion of cellulosic material.

3. A process which comprises treating with sulphuric and sulphurous acids spent alkaline sodium base liquor resulting from the digestion of cellulosic material to coagulate organic matter from such liquor and thus to produce a solution of sodium sulphate and sodium sulphite, separating out the coagulated organic matter, and acidulating the solution with sulphur dioxide, for acid digestion of cellulosic material.

4. A process which comprises treating with sulphuric acid in the form of niter cake spent alkaline sodium base liquor resulting from the digestion of cellulosic material to coagulate organic matter from such liquor and thus to produce a solution of sodium sulphate, separating out the coagulated organic matter, and acidulating the sodium sulphate solution with sulphur dioxide for the acid digestion of cellulosic material.

5. A process which comprises treating with sulphuric acid in the form of niter cake and with sulphurous acid in the form of sodium bisulphite spent alkaline sodium base liquor resulting from the digestion of cellulosic material to coagulate organic matter from such liquor and thus to produce a solution of sodium sulphate and sodium sulphite, separating out the coagulated organic matter, and acidulating the solution with sulphur dioxide, for the acid digestion of cellulosic material.

6. A process which comprises treating with sulphuric acid spent alkaline sodium base liquor resulting from the cooking of cellulosic material to coagulate organic matter from such liquor and thus to produce a sodium sulphate solution, allowing the liquor so treated to stand until the coagulated matter settles out and a substantially clear, supernatant solution is produced, separating the clear solution from the settled-out material, and acidulating the separated solution with sulphur dioxide for the acid digestion of cellulosic material.

7. A process which comprises treating with sulphuric acid spent alkaline sodium base liquor resulting from the digestion of cellulosic material to coagulate organic matter from such liquor and to produce a distinctly acid sodium sulphate solution, separating out the coagulated organic matter, neutralizing the solution, and acidulating the solution with sulphur dioxide for the acid digestion of cellulosic material.

In testimony whereof I have affixed my signature.

GEORGE A. RICHTER.